(12) United States Patent
Rilhac et al.

(10) Patent No.: US 12,343,659 B2
(45) Date of Patent: Jul. 1, 2025

(54) METHOD FOR MICROFLUIDIC EXTRACTION FROM VEGETABLE OIL

(71) Applicant: CHANEL PARFUMS BEAUTE, Neuilly sur Seine (FR)

(72) Inventors: Vincent Rilhac, Pantin (FR); Alix Toribio, Pantin (FR)

(73) Assignee: CHANEL PARFUMS BEAUTE, Neuilly sur Seine (FR)

(*) Notice: Subject to any disclaimer, the term of this patent is extended or adjusted under 35 U.S.C. 154(b) by 756 days.

(21) Appl. No.: 17/642,851

(22) PCT Filed: Sep. 25, 2020

(86) PCT No.: PCT/EP2020/077011
§ 371 (c)(1),
(2) Date: Mar. 14, 2022

(87) PCT Pub. No.: WO2021/058806
PCT Pub. Date: Apr. 1, 2021

(65) Prior Publication Data
US 2022/0395766 A1 Dec. 15, 2022

(30) Foreign Application Priority Data
Sep. 26, 2019 (EP) ..................... 19306206

(51) Int. Cl.
*B01D 11/04* (2006.01)
*A23F 5/48* (2006.01)
(Continued)

(52) U.S. Cl.
CPC ............ *B01D 11/0496* (2013.01); *A23F 5/48* (2013.01); *A23L 33/105* (2016.08); *B01D 11/0484* (2013.01); *B01D 11/0492* (2013.01)

(58) Field of Classification Search
CPC ............ B01D 11/0496; B01D 11/0484; B01D 11/0492; A23L 33/105; A23L 5/48
See application file for complete search history.

(56) References Cited

U.S. PATENT DOCUMENTS 6,355,693 B1   3/2002  Herslöf et al.
2018/0206514 A1* 7/2018  Birch ................... A23F 5/483

FOREIGN PATENT DOCUMENTS

CA        2754707 A1     9/2010
CN      206372554 U      8/2017
(Continued)

OTHER PUBLICATIONS

Qin et al. (A successive laminar flow extraction for plant medicine preparation by microfluidic chip, Microfuidics and Nanofuidics (2019) 23:61) (Year: 2019).*
(Continued)

*Primary Examiner* — Youngsul Jeong
(74) *Attorney, Agent, or Firm* — Maier & Maier, PLLC

(57) ABSTRACT

A process for the microfluidic extraction of molecules of interest from a vegetable oil, which utilizes a microfluidic chip with a double-Y-channel circuit, two inlets, two outlets, and a main channel, a first vessel including vegetable oil and a second vessel including ethanol for extraction, a pressure controller for pressurizing the vegetable oil and the ethanol, a first collector for the triglycerides-enriched vegetable oil and a second collector for molecules of interest-enriched ethanol. The extraction process includes: controlling the pressures to subject each of the vegetable oil and the ethanol to a pressure, so the interface between the two fluids is positioned at the junction point of inlets, bringing the vegetable oil and ethanol into contact with each other in the main channel for a time to enable extraction of the molecules of interest, collecting the molecules of interest-enriched
(Continued)

ethanol, optionally, evaporating the ethanol, collecting the triglycerides-enriched vegetable oil.

10 Claims, 4 Drawing Sheets

(51) Int. Cl.
*A23L 33/10* (2016.01)
*A23L 33/105* (2016.01)

(56) References Cited

FOREIGN PATENT DOCUMENTS

| | | |
|---|---|---|
| FR | 3049472 A1 | 10/2017 |
| JP | 2017-518754 A | 7/2017 |
| WO | 9612541 A1 | 5/1996 |
| WO | 2015197340 A | 12/2015 |

OTHER PUBLICATIONS

Cuevas et al. (Vegetable Oils Deacidification by Solvent Extraction: Liquid-Liquid Equilibrium Data for Systems Containing Sunflower Seed Oil at 298.2 K, Journal of Chemical & Engineering Data, 2010, vol. 55/Issue 9, pp. 3859-3862) (Year: 2010).*

Japon-Lujan et al. (Liquid-Liquid Extraction for the Enrichment of Edible Oils with Phenols from Olive Leaf Extracts, J. Agric. Food Chem. 2008, 56, 2505-2511) (Year: 2008).*

International Search Report mailed Dec. 9, 2020, corresponding to International Application No. PCT/EP2020/077011; 7 pages (with English Translation).

Kishore K. R. Tetala et al., "A three-phase microfluidic chip for rapid sample clean-up of alkaloids from plant extracts"; Lab on a Chip; vol. 9; No. 14; Jan. 1, 2009; ISSN: 1473-0197; XP055676624; pp. 2085-2092.

Weiwei Qin et al., "A successive laminar flow extraction for plant medicine preparation by microfluidic chip"; Microfluidics and Nanofluidics, Springer, DE; vol. 23; No. 4; Mar. 30, 2019; ISSN: 1613-4982; XP036755521; 8 pages.

Xuan Mu et al., "Selectively modified microfluidic chip for solvent extraction of Radix Salvia Miltiorrhiza using three-phase laminar flow to provide double liquid-liquid interface area"; Microfluidics and Nanofluidics, Springer, Berling, DE; vol. 9; No. 2-3; Dec. 24, 2009; ISSN: 1613-4990; XP019811137; pp. 365-373.

Office Action issued on May 8, 2023, in corresponding Japanese Application No. 2022-519298, 6 pages.

Office Action issued on Dec. 15, 2022, in corresponding Chinese Application No. 202080066821.9, 11 pages.

Office Action issued on Mar. 21, 2023, in corresponding European Application No. 19306206.4, 20 pages.

Goncalves et al., "Fractionation of orange essential oil using liquid-liquid extraction: Equilibrium data for model and real systems at 298.2 K.", Fluid Phase Equilibria, 2015, vol. 399, pp. 87-97.

Koshima et al., "Fractionation of Bergamot and Lavandin Crude Essential Oils by Solvent Extraction: Phase Equilibrium at 298.2 K", Journal of Chemical & Engineering Data, 2014, vol. 60 No. 1, pp. 37-46.

Arce et al., "Citrus Essential Oil Deterpenation by Liquid-Liquid Extraction", Canadian Journal of Chemical Engineering, 2005, vol. 83 No. 2, pp. 366-370.

* cited by examiner

[Fig. 1]
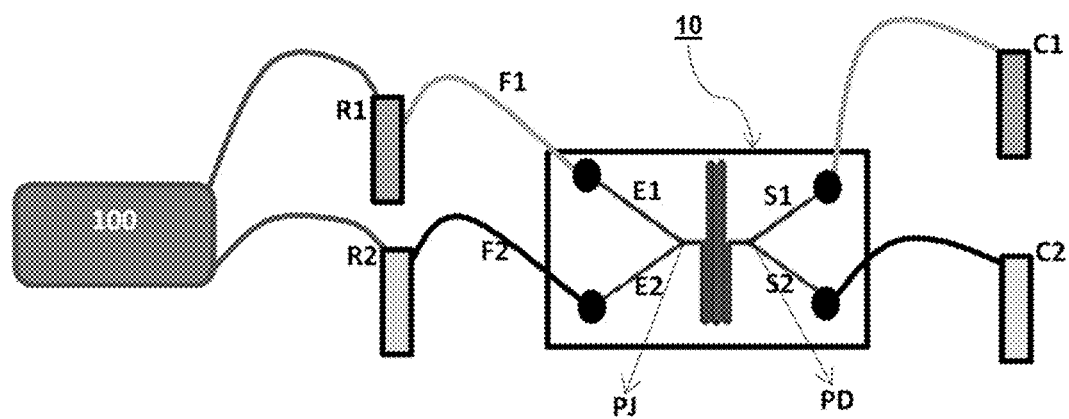
[Fig. 2]
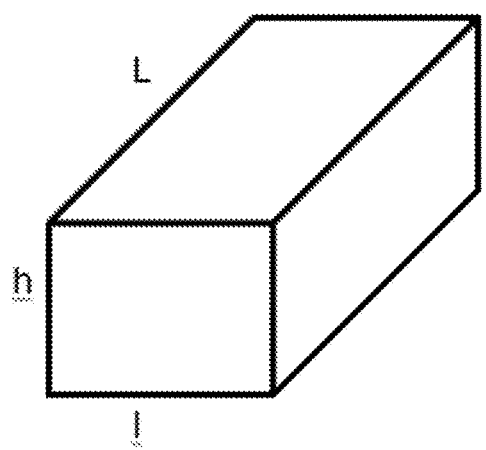

[Fig. 3]
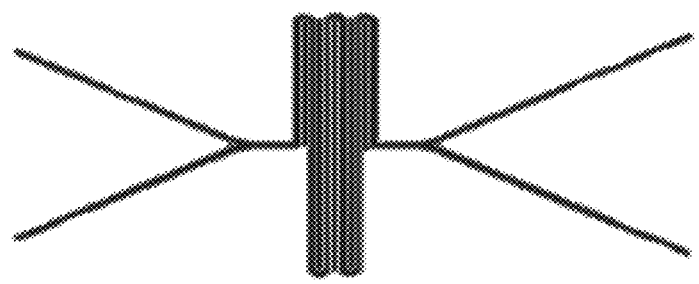
[Fig. 4]
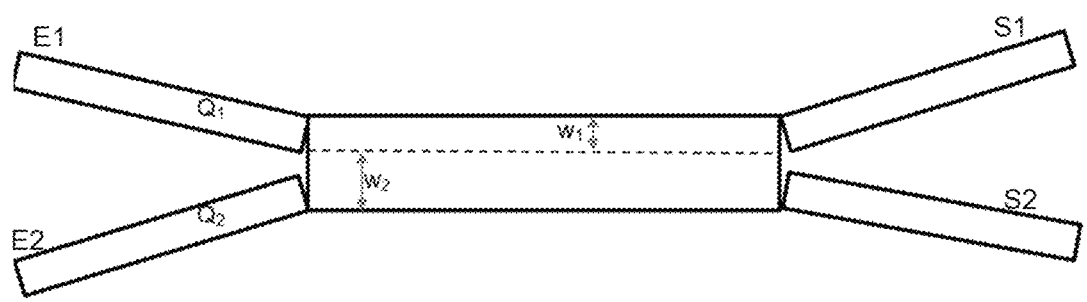

[Fig. 5]
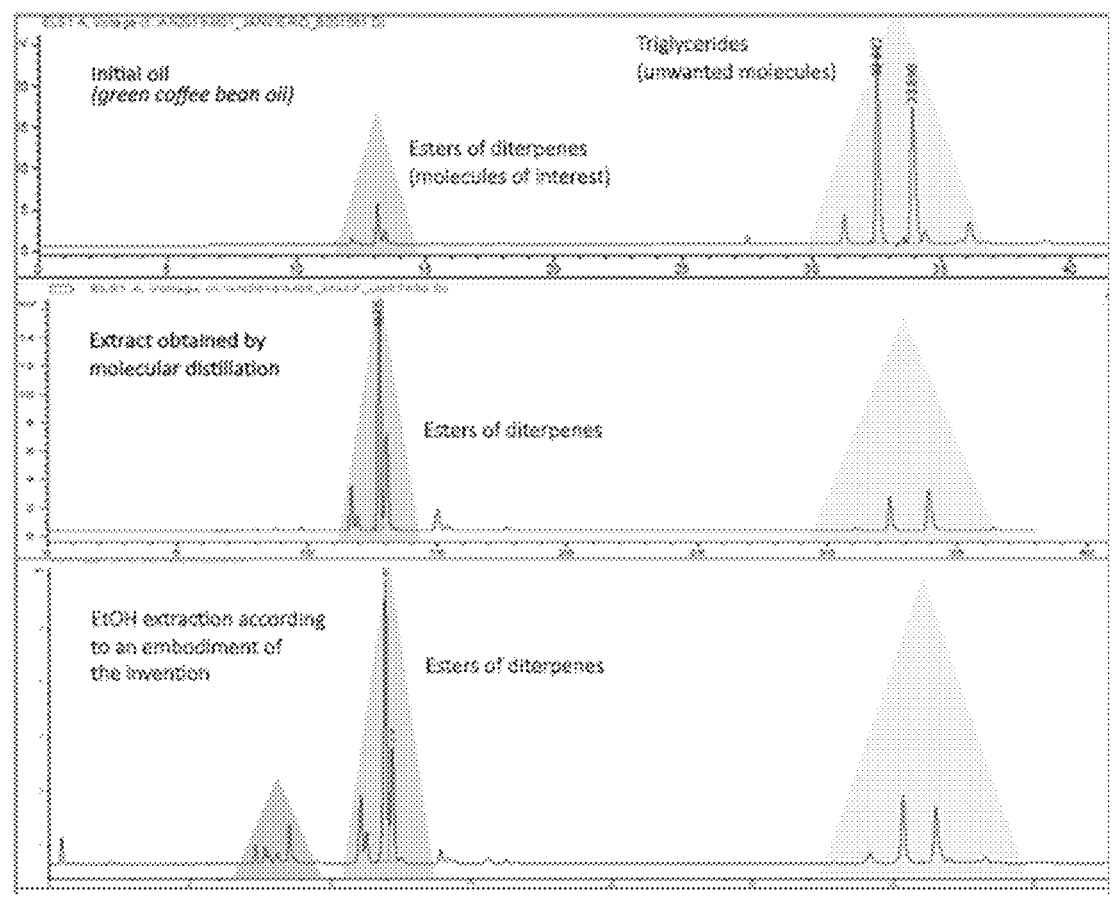

[Fig. 6]
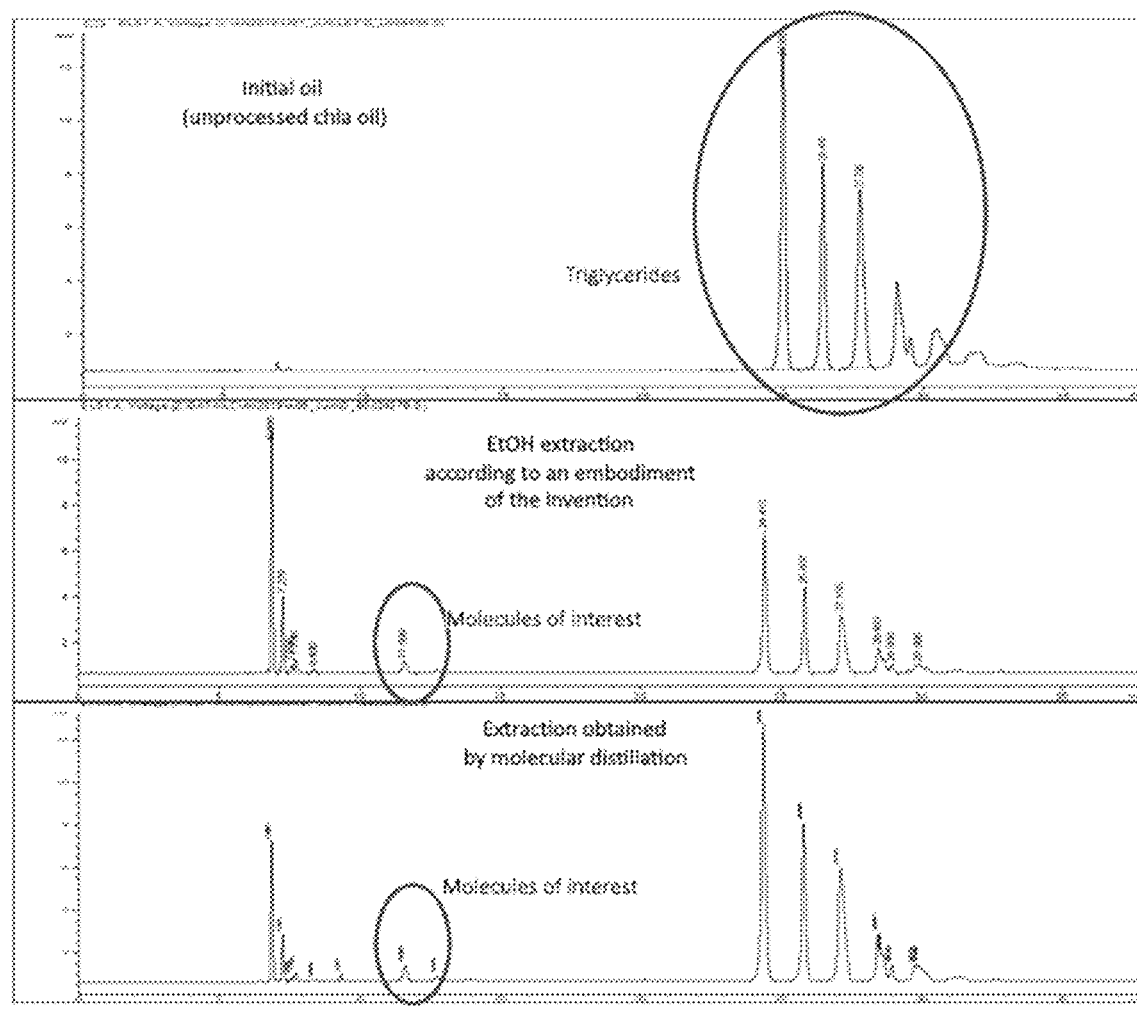

METHOD FOR MICROFLUIDIC EXTRACTION FROM VEGETABLE OIL

FIELD

The invention relates to the field of liquid-liquid extraction carried out under conditions which fall within the field of microfluidics. The invention has applications in the cosmetics sector in particular.

BACKGROUND

The active ingredients in cosmetics play a wide variety of roles. They make it possible to give a cosmetic composition a moisturizing, anti-aging, fragrant, skin treating, or visual character, for example. It is often desirable for active ingredients in solution to be concentrated prior to use. Liquid-liquid extraction or molecular distillation are conventional methods known to those skilled in the art.

Molecular distillation is fractional distillation under extremely low vacuum pressure. It is complex to implement and requires a lot of energy to operate. Molecular distillation is carried out at high temperatures; it allows isolating vaporizable molecules but can cause degradation of the active ingredients extracted, however.

Liquid-liquid extraction is a classic separation process in chemistry. It consists of extraction by transferring a molecule of interest (or active ingredient, both having the same meaning in this description) contained in a first liquid (the raffinate) to a second liquid immiscible with the first (the extraction solvent). At the end of the extraction, an extract formed from the solvent enriched in the molecule of interest and a raffinate depleted of the molecules of interest are collected. The concentration of the molecule of interest in the solvent is thus increased.

Conventional liquid-liquid extraction takes place, for example, in a separatory funnel whose capacity is adapted to requirements. The two liquids are mixed in the separatory funnel and then left to stand until formation of two distinct phases which can then be separated.

The conventional liquid-liquid extraction discussed above has several disadvantages, however. In particular, such an extraction system does not allow continuous extraction. Indeed, the various extractions are carried out in different containers, for example several separatory funnels, of defined quantities. The extractions are then said to be carried out in "batch" mode. Several extractions and decantations are therefore necessary before the desired quantity of enriched solvent is obtained. In addition, significant labor is required to transfer the reagents and products from one container to another.

In addition, the contact surface area between the two phases involved in a conventional fluid-fluid extraction is limited to the size of the container in which said phases are located. Similarly, the diffusion of the molecules of interest from one phase to another is limited because of the large volumes involved. Finally, depending on the liquids used, for example oily extracts, emulsions may appear, making the separation all the more difficult and increasing the length of decantation of the phases. Collection of the enriched solvent and raffinate is also negatively impacted, since raffinate may be found in the solvent and solvent in the raffinate.

It is therefore important to find a new method for efficiently extracting the sometimes rare and/or fragile active ingredients in sufficient quantity, satisfying for example the needs of the cosmetics industry. It is also important to find a method that can be implemented at room temperature so as not to degrade the active ingredients extracted.

The field of microfluidics is a recent field at the frontiers of physics and chemistry, involving very small volumes of liquid, for example on the order of a micro-litre (µL) to a femto-litre (fL). Such dimensions allow easily satisfying multiple constraints of fluid mechanics. For example, the flow obtained in a microfluidic system is easily laminar because the expression of the Reynolds number depends directly on the dimensions of the system. Similarly, diffusion of the molecules of interest is favored over their convection, due to the expression of the Peclet number which also directly depends on the dimensions of the system.

Microfluidic extraction is a liquid-liquid extraction process which consists of bringing two fluids into contact within channels whose dimensions are on the order of a hundredth of a micrometer (0.01 µm) to a millimeter (mm).

SUMMARY

The inventors unexpectedly discovered that a microfluidic extraction process using what is called a "double-Y-channel" microfluidic chip made it possible to carry out continuous extraction of the active ingredient with an enrichment efficiency as high as a conventional process in "batch" mode or molecular distillation. Microfluidic extraction also has the advantage that it can be carried out at room temperature and thus avoid degradation of the extracted molecules of interest. Finally, microfluidic extraction occupies less space and consumes less energy than conventional extraction processes used to date.

The invention is also of interest for the extraction and refining of vegetable oils. Vegetable oils consist mainly of fatty acids and a minor portion of unsaponifiable molecules. Unsaponifiable molecules is understood to mean all molecules insoluble in water after saponification. Mention may be made, without this being limiting, of terpenes, sesquiterpenes, squalenes, phytosterols, polyphenols, lignans, and vitamins. However, it is precisely in the unsaponifiable fraction of a vegetable oil that the active ingredients of interest for cosmetics are found. The object of the invention is thus a process for the microfluidic extraction of molecules of interest from a vegetable oil, for example coffee oil or chia oil, comprising:

a microfluidic chip 10 with a double-Y-channel circuit, comprising two inlets E1 and E2, two outlets S1 and S2, and a main channel,
  a first vessel R1 comprising vegetable oil F1, a second vessel R2 comprising a solvent F2 for extracting the molecules of interest, immiscible with the vegetable oil F1, said extraction solvent being ethanol, said first and second vessels R1, R2 each being in fluid connection with the inlets E1 and E2 of the microfluidic chip 10,
  a pressure controller 100 capable of pressurizing the vegetable oil F1 and said extraction solvent F2,
  a first collector C1 in fluid connection with the microfluidic chip 10, in which the vegetable oil F1 enriched in triglycerides is collected,
  a second collector C2 in fluid connection with the microfluidic chip 10, in which the extraction solvent F2 enriched in molecules of interest is collected, said extraction process comprising the following steps:
  a) controlling the pressures P1 and P2 in order to subject the liquid vegetable oil F1 to a pressure P1 and the extraction solvent F2 to a pressure P2, such that the interface between the two fluids is positioned at the junction point of inlets E1 and E2, b) bringing the vegetable oil F1 and the extraction solvent F2 into contact with each other in the main channel for a period of time enabling extraction of the molecules of interest,
c) collecting the extraction solvent F2 enriched in molecules of interest,
d) optionally, evaporating the extraction solvent F2, and
e) collecting the vegetable oil F1 enriched in triglycerides.

BRIEF DESCRIPTION OF DRAWINGS

FIG. 1 shows a diagram of the microfluidic extraction process according to one embodiment of the invention.

FIG. 2 shows a diagram of a main channel of rectangular shape, according to one embodiment of the invention.

FIG. 3 shows a diagram of a microfluidic chip with a main channel in serpentine form, according to one embodiment of the invention.

FIG. 4 shows a simplified explanatory diagram of a double-Y-channel microfluidic chip, according to one embodiment of the invention.

FIG. 5 shows the HPLC chromatograms of a coffee oil having molecules of interest, the HPLC chromatogram of an extraction of said oil according to one embodiment of the invention, and an HPLC chromatogram of an extraction according to a conventional method of molecular distillation.

FIG. 6 shows the HPLC chromatograms of chia oil exhibiting molecules of interest, the HPLC chromatogram of an extraction of said oil according to one embodiment of the invention, and an HPLC chromatogram of an extraction according to a conventional method of molecular distillation.

DETAILED DESCRIPTION

The invention therefore provides the advantage of collecting an ethanolic extract enriched in molecules of interest, which are the unsaponifiables.

The invention provides a second advantage, in that the ethanolic extract obtained is not only enriched in molecules of interest but it can also comprise new molecules, such as ethyl esters in the particular case where the vegetable oil is a coffee oil.

The invention provides a third advantage, in that the second output liquid corresponds to an oil that is directly refined and enriched in triglycerides. Unlike conventional oil refining methods which require the use of an acid and base and comprise energy-intensive steps of heating the oil, the invention makes it possible to refine a vegetable oil and obtain as output from a microfluidic chip a deodorized refined oil in which the concentration of free fatty acids is reduced.

The invention therefore makes it possible to extract a refined oil and an ethanolic extract enriched in active molecules, in a single step. The two output liquids are thus of cosmetic interest.

The extraction according to the process of the invention can advantageously be carried out at room temperature, preferably between 20 and 30° C., more preferably between 22 and 27° C.

Unlike traditional molecular distillation extractions which are carried out at higher temperatures of up to 280° C., the implementation of a microfluidic extraction according to the invention at room temperature makes it possible to avoid thermal degradations that are harmful for vegetable oils. Similarly, unlike the conventional refining of vegetable oil which requires heating steps, implementing the microfluidic extraction of the invention allows refining a vegetable oil at room temperature.

Microfluidic Chip

A "double-Y-channel" microfluidic chip used in the process of the invention is illustrated in a non-limiting manner by the diagram of FIG. 1.

The microfluidic chip 10 of FIG. 1 shows two inlets E1 and E2 formed by two distinct channels which join at a point called the "junction point" PJ to form a single channel called the "main channel".

Said main channel divides at the "separation point" PD into two new distinct channels forming the two outlets S1 and S2 of the microfluidic chip 10.

In this application, the term "fluid connection" refers to a connection means enabling the transfer of fluid F1 or F2 between the different elements to which it refers.

The two inlets E1 and E2 may be in fluid connection for example via pipes with the respective vessels R1 and R2 such that the fluids F1 and F2 can circulate in the microfluidic chip 10.

Similarly, the two outlets S1 and S2 may be in fluid connection for example via pipes with the respective collectors C1 and C2 such that the fluids F1 and F2 can be discharged from the microfluidic chip 10.

According to one embodiment of the invention, inlet E1 may be connected to a first vessel R1 containing a fluid F1, said fluid F1 being a vegetable oil, for example a coffee oil or chia oil. Inlet E2 may be connected to a second vessel R2 containing a fluid F2 different from the first fluid, said fluid F2 being for example an extraction solvent. Outlet S1 may be connected to a first collector C1 for receiving fluid F1 depleted of or enriched in the molecule of interest, as it exits the microfluidic chip. In the case where fluid F1 is vegetable oil, said first collector then collects the refined vegetable oil depleted of the molecule of interest, deodorized and having a reduced concentration of free fatty acids. Outlet S2 may be connected to a second collector C2 in order to receive fluid F2 depleted of or enriched in a molecule of interest. In the case where fluid F2 is an extraction solvent, said second collector C2 then collects the extraction solvent enriched in the molecule of interest.

In the following portion of the description, fluid F1 is considered to be a vegetable oil such as coffee oil or chia oil and fluid F2 to be ethanol as the extraction solvent.

The main channel may be of various shapes: the cross-section of said main channel may be in a non-limiting manner a square, a circle, a semicircle, a rectangle, a diamond, a regular polygon, or an irregular polygon. Preferably, the cross-section of the main channel of the microfluidic chip 10 is of rectangular shape.

The diagram of FIG. 2 shows a perspective view of a rectangular-shaped main channel characterized by a depth h, a width I, and a total volume V. Said total volume of said main channel is considered between the junction point PJ and the separation point PD.

The main channel of the microfluidic chip used in the process of the invention may have a width I between 50 and 500 µm, preferably between 100 and 300 µm, and preferably 200 µm,
  a depth H between 1 and 800 µm, preferably 5 and 500 µm, more preferably 10 and 200 µm, even more preferably 50 and 150 µm, and more particularly 100 µm,
  a total volume V of the channel, between the junction point PJ and the separation of the two outlet channels of the Y at the separation point PD, of between 0.1 µL and 20 µL, preferably 0.2 µL and 10 µL, more preferably 0.3 and 5 µL, even more preferably 0.4 and 1.5 µL, more particularly 1 µL.

Microfluidic extraction offers the advantage of increasing the contact surface area between the fluids within the main channel, and thus optimizes diffusion of the molecules of interest from one liquid to another.

The main channel of the microfluidic chip 10 may further have a general geometry in the plane of the microfluidic chip 10 in the shape of concentric circles, squares, or diamonds, of a line, and preferably a serpentine shape.

The microfluidic chip 10 of FIG. 3 shows, in a non-limiting manner, an example of a main channel whose general geometry in the plane of the microfluidic chip 10 is a serpentine shape.

The general geometry in the plane of the channel can, for example, optimize the space occupied by the system.

The extraction according to the process of the invention also offers the advantage of being able to be carried out in parallel, meaning that N microfluidic chips with a "double-Y-channel" circuit can be operated in parallel, N being an integer between 1 and 200,000, preferably between 500 and 200,000, more preferably between 1,000 and 100,000.

An extraction process with several microfluidic chips in parallel has the advantage of considerably increasing the processing capacity of the system. A system comprising, for example, 100,000 microfluidic chips operated in parallel can achieve a total throughput (said total throughput corresponding to the sum of the throughputs for extracting extraction solvent enriched in molecules of interest) of at least 16.2 kg/h, i.e. almost 10 times more than a conventional treatment such as laboratory molecular distillation. There are existing molecular distillation devices which allow distilling tons of product per day, but such devices are extremely bulky and expensive.

A system comprising, for example, 100,000 microfluidic chips operated in parallel also saves space compared to the conventional extraction processes discussed above.

The invention advantageously makes it possible to connect 100,000 microfluidic chips operated in parallel, while occupying only 1 m² of floor space.

The microfluidic chip 10 used in the process of the invention may be made of a material selected among thermoplastics, glass, silicon, polymers such as silicone and preferably PDMS. Glass is particularly preferred, since it is inert and therefore does not react with the extraction solvent (ethanol).

Pressure Controller

The microfluidic chip according to the invention is also connected to a pressure controller 100. Said pressure controller 100 advantageously makes it possible to apply pressure to the nearest tenth, preferably to the nearest hundredth of a millibar in order to control the flow of fluids F1 and F2 within the microfluidic chip.

Said pressure controller 100 is connected to the first vessel R1 and to the first collector C1 so that fluid F1 is subjected to a pressure P1.

Said pressure controller 100 is connected to the first vessel R2 and to the first collector C2 so that fluid F2 is subjected to a pressure P2.

Said pressure controller 100 is for example connected, using a hermetically-sealed pipe that does not allow air to escape, to vessels R1 and R2 so as to apply a pressure P1 and P2 thereto.

The pressure independently applied to fluids F1 and F2 has a direct impact on the flow rate of said fluids at inlets E1 and E2 and at outlets S1 and S2 of the microfluidic chip 10. In general, the pressure and flow rate are linearly related according to Math equation. 1 below.

$$P = R \cdot Q \qquad \text{[Math. 1]}$$

P is the pressure to which the fluid is subjected and is expressed for example in millibars (mbar).

Q is the rate at which the fluid flows and is expressed, for example, in microliters per second (µL/s).

R is a homogeneous coefficient at a pressure divided by a flow rate and can be measured experimentally in a manner known to those skilled in the art.

The pressure also has a direct impact on the location of fluids within the channel. FIG. 4 shows a simplified diagram of a double-Y-channel microfluidic chip. Q1 is the rate at which fluid F1 flows through the microfluidic chip and Q2 is the rate at which fluid F2 flows. w1 is the width occupied in the main channel by fluid F1 when the channel is viewed from above and $w_2$ is the width occupied in the main channel by fluid F2 when the channel is viewed from above.

In order to optimize diffusion within the channel, the widths occupied by the two fluids F1 and F2 within the channel as viewed from above are advantageously equal. Advantageously, the following equality is satisfied: $w_1 = w_2$.

Furthermore, the following equality Math. 2 is always satisfied within the main channel of the microfluidic chip:

$$\frac{w1}{w2} = \frac{\mu 1 \cdot Q1 \cdot \rho 2}{\mu 2 \cdot Q2 \cdot \rho 1} \qquad \text{[Math. 2]}$$

$w_1$ and $w_2$ are the widths respectively occupied by fluids F1 and F2 within the main channel of the microfluidic chip as viewed from above, $\mu_1$ and $\mu_2$ are the respective dynamic viscosities of fluids F1 and F2, $Q_1$ and $Q_2$ are the respective flow rates of fluids F1 and F2, and $\rho_1$ and $\rho_2$ are the respective densities of fluids F1 and F2.

If fluids F1 and F2 evolve within the same system, combining the equalities according to equations Math. 1 and Math. 2 results in the equality according to equation Math 3 below:

$$\frac{w1}{w2} = \frac{P1}{P2} \qquad \text{[Math. 3]}$$

$w_1$ and $w_2$ are the widths respectively occupied by fluids F1 and F2 within the main channel of the microfluidic chip as viewed from above; P1 and P2 are the pressures to which fluids F1 and F2 are subjected.

Ideally, the widths $w_1$ and $w_2$ within the main channel of the microfluidic chip should be equal at the exit from the main channel, to ensure proper separation of the fluids enriched in and depleted of the molecules of interest. In order to satisfy this equality, compliance with equation Math. 3 implies that the pressures P1 and P2 respectively applied to fluids F1 and F2 must be equal.

The inventors have surprisingly discovered that applying two identical pressures P1 and P2 to fluids F1 and F2 does not yield the effect expected by the theory set forth above. Indeed, the inventors have observed different widths $w_1$ and $w_2$ at the junction point PD, such that an amount of fluid F2 is mixed in with fluid F1 at outlet S1.

This observation can be partly explained by the pressure losses undergone by the fluids. These pressure losses largely depend on the fluids concerned, the contact between the fluids and with the walls of the system, the geometry of the channel, as well as the flow rates of fluids F1 and F2.

The inventors have discovered several pairs of pressures (P1, P2) which satisfy the condition $w_1=w_2$ all along the main channel and in particular at the separation point PJ of the microfluidic chip.

According to one embodiment of the invention, the pressure controller 100 is operated so that the fluids F1 and F2 are respectively subjected to pressures (P1, P2) such that:
P1 is between 65 and 75 mbar,
P2 is between 63 and 73 mbar, or else the pressure controller 100 is operated so that the fluids F1 and F2 are subjected to pressures (P1, P2) such that:
P1 is between 190 and 210 mbar,
P2 is between 186 and 206 mbar.

Also, according to one embodiment of the invention, the pressure controller 100 is operated so that the flow rate of the extraction solvent exiting the microfluidic chip is between 0.01 µL/s and 500 µL/s, preferably between 0.1 µL/s and 12 µL/s, more preferably between 0.5 and 1 µL/s.

Also, according to one embodiment of the invention, the pressure controller 100 is operated so that the flow rate of the vegetable oil exiting the microfluidic chip is between 0.001 µL/s and 500 µL/s, preferably between 0.005 µL/s and 10 µL/s, more preferably between 0.005 and 0.01 µL/s.

In order to ensure that the solvent enriched in molecules of interest collected in the collector C2 is not contaminated by raffinate of the refined vegetable oil obtained at outlet S1, a safety margin "a" may be observed.

In the case where a safety margin "a" is observed, the pressure controller is operated at pairs of pressures (P1, P2) satisfying the following condition $w_1=a \cdot w_2$ at the separation point, $w_1$ and $w_2$ being the widths respectively occupied by fluids F1 and F2 within the main channel of the microfluidic chip 10, a being a positive real safety margin between 0 and 1, the values 0 and 1 being excluded.

If a safety margin is observed, a is between 0.85 and 0.95; preferably a is 0.9.

According to one embodiment of the invention, the pressure controller 100 is selected among commercially-available pressure controllers capable of satisfying the conditions defined above. The pressure controller of the invention is for example the Elveflow pressure controller marketed by the Elvelys company.

Vegetable Oil

The vegetable oil is selected according to the desired molecule of interest. The vegetable oil is for example coffee oil or chia oil.

The vegetable oils used in the method of the invention have high viscosity coefficients, greater than 30 mPa·s.

Extraction Solvent

In the invention, the extraction solvent chosen is ethanol.

The ethanol is advantageously biobased. It is non-toxic and solubilizes with the desired molecules of interest. The interface between vegetable oil and ethanol within the channel of the microfluidic chip is also particularly stable.

Extraction Process

The extraction process according to the invention may comprise a first step a) consisting of operating the pressure controller 100 at a particular pair of pressures P1, P2 in order to subject the fluids F1 and F2 to the respective pressures P1 and P2 so as to have an interface between the two fluids positioned at the junction point PJ of the double-Y-channel microfluidic chip.

Depending on the characteristics of the microfluidic chip, the characteristics of the main channel, the general geometry of the main channel, and the flow rates of fluids F1 and F2, the vegetable oil F1 and the ethanol (extraction solvent) F2 are brought into contact for a period of time which allows extracting the molecules of interest.

The extraction process according to the invention may comprise a second step b) during which the fluids are brought into contact for a period of time which allows extracting the molecules of interest. In particular, the contact time is between 5 and 300 seconds, preferably 8 and 200 seconds, more preferably from 10 to 100 seconds, and even more preferably from 50 to 70 seconds.

The longer the extraction time, the higher the mass yield of the extraction can be. The mass yield corresponds to the mass of the extract containing the molecules of interest in the ethanol (extraction solvent) F2 collected at outlet S2, compared to the initial mass of the vegetable oil F1 at inlet E1.

Mass yield is highly dependent on the vegetable oil chosen. For example, if the vegetable oil is coffee oil, a mass yield greater than or equal to 5%, preferably greater than or equal to 10%, more preferably around 15%, is satisfactory. On the other hand, if the vegetable oil is chia oil, which has a lower concentration of unsaponifiables than coffee oil, a mass yield of at least 1%, preferably 1.5%, is satisfactory.

The extraction process according to the invention comprises a third step c) where the ethanol (extraction solvent) enriched in the molecule of interest is collected and optionally reused for the extraction process.

The extraction process according to the invention may for example be connected to a purification device making it possible to obtain molecules of interest continuously by reusing the ethanol (extraction solvent) for the extraction process.

The ethanolic extract obtained by means of the process according to the invention is not only enriched in molecules of interest, but may also comprise new molecules such as ethyl esters, formed during the extraction.

The extraction process according to the invention may comprise a fourth optional step d) in which the ethanol (extraction solvent) enriched in the molecule of interest is evaporated.

The ethanol (extraction solvent) enriched in molecules of interest may also be subjected to various purification treatments aimed at increasing the concentration of the molecules of interest.

The molecules of interest are then more easily collected and incorporated for example into cosmetic compositions. The ethanol (extraction solvent) thus evaporated can advantageously be recycled and reused in the extraction process.

The extraction process according to the invention comprises a step e) of collecting the vegetable oil F1 enriched in triglycerides.

Indeed, the obtained vegetable oil output by the extraction process of the invention corresponds to a refined oil enriched in triglycerides.

The refined oil thus obtained is in particular deodorized, bleached, and its concentration of free fatty acids reduced.

EXAMPLES

Process According to the Example

The extraction process according to the example comprises a device as illustrated in FIG. 1. Said extraction process comprises a pressure controller 100, said pressure controller 100 being connected to a first vessel R1 comprising the vegetable oil F1, a second vessel R2 comprising ethanol (extraction solvent) F2, a first collector C1 collecting the vegetable oil raffinate depleted of the molecule of interest, and a second collector C2 collecting the extract of the extraction solvent enriched in molecules of interest.

Said extraction process further comprises a double-Y-channel microfluidic chip 10 comprising two inlets E1 and E2 respectively in fluid connection with the two vessels R1 and R2, and two outlets S1 and S2 in fluid connection with the two collectors C1 and C2.

Example 1: Coffee Oil

In Example 1, the pressure controller 100 is of the Elveflow type marketed by the Elvesys company. The vegetable oil F1 is a coffee oil, the molecules of interest are esters of diterpenes, and the extraction solvent F2 is ethanol.

The coffee vegetable oil is obtained by the following process:
"Unroasted" green coffee beans (*Coffea arabica*) are dried beforehand
The dried beans are then pressed using a mechanical single-screw bar press.
After four passes, a crude oil is obtained.
The crude oil is then filtered to 50 µm, and the filter cake is removed.
The resulting vegetable oil is then used for the invention.
The viscosity of coffee oil is high and is about 104 mPa-s.

The main channel of the microfluidic chip 10 is rectangular in shape and serpentine. The channel has a depth of 100 µm, a width of 200 µm, and its volume is 1 µL. Each of the fluids shares half the volume, i.e. occupies 0.5 µL.

Step a)
The pressure controller 100 is operated so that fluid F1 is subjected to a pressure P1 of 72 mbar, such that the flow rate of fluid F1 is 0.01083 µL/s.
The pressure controller 100 is operated so that fluid F2 is subjected to a pressure P2 of 70 mbar, such that the flow rate of fluid F2 is 0.679 µL/s.

Step b)
The vegetable oil F1 and the extraction solvent F2 are brought into contact within the microfluidic chip for a period of time of about 45 seconds.

Step c)
The ethanol (extraction solvent) F2 enriched in molecules of interest is collected into collector C2 as it exits the microfluidic chip 10.

Steps d) and e)
The process according to the example comprises a step d) where the ethanol (extraction solvent) F2 is evaporated before collecting the molecules of interest. It also includes a step e) where the refined oil is also collected.

Result
The mass yield obtained from the extraction process of Example 1 is 17.7%. The extraction was carried out continuously for 2580 min.

Thus, the inventors surprisingly discovered that a liquid-liquid extraction process using a microfluidic chip allows obtaining a mass extraction yield greater than or equal to the extraction yields obtained by means of extraction processes conventionally used, for example molecular distillation or liquid-liquid extraction in batch mode. In addition, the ethanolic extract thus obtained comprises new molecules such as ethanolic esters. As for the extracted vegetable oil, it is refined, and can be used as is in cosmetic preparations.

Example 2: Chia Oil

In Example 2, the pressure controller 100 is of the Elveflow type marketed by the Elvesys company. The vegetable oil F1 is chia oil, the molecules of interest are phytosterols, and the extraction solvent F2 is ethanol.

The process for obtaining chia oil is as follows:
The chia seeds (*Salvia hispanica*) are dried beforehand,
The dried seeds are pressed using a mechanical single-screw bar press.
After three passes, a crude oil is obtained.
The crude oil obtained is then filtered to 50 µm, and the filter cake is removed.
The resulting vegetable oil is then used for implementing the invention.

The viscosity of chia oil is about 35.6 mPa-s.

The main channel of the microfluidic chip 10 is rectangular in shape and serpentine. The channel has a depth of 100 µm, a width of 200 µm, and its volume is 1 µL. Each of the fluids shares half the volume, i.e. occupies 0.5 µL.

Step a)
The pressure controller 100 is operated so that fluid F1 is subjected to a pressure P1 of 519 mbar. The pressure controller 100 is operated so that fluid F2 is subjected to a pressure P2 of 511 mbar.

Step b)
The vegetable oil F1 and the ethanol F2 are brought into contact within the microfluidic chip for a period of time of approximately 2.5 seconds.

Step c)
The ethanol (extraction solvent) F2 enriched in molecules of interest is collected into collector C2 as it exits the microfluidic chip 10.

Steps d) and e)
The process according to the example comprises a step d) where the ethanol (extraction solvent) F2 is evaporated before collecting the molecules of interest. The refined chia oil is also collected in a step e).

Result
The mass yield obtained from the extraction process of Example 2 is 1.61%. The extraction was carried out continuously for 204 minutes.

Thus, the inventors surprisingly discovered that a liquid-liquid extraction process using a microfluidic chip allows obtaining a mass extraction yield greater than or equal to the extraction yields obtained by means of extraction processes conventionally used, for example molecular distillation or liquid-liquid extraction in batch mode. The extracted vegetable oil is refined, and can be used as is in cosmetic preparations.

Comparative Example with Molecular Distillation

A comparative example was carried out in order to compare the extraction results according to the process of the invention of Example 1, to extraction results obtained according to a conventional extraction by molecular distillation.

FIG. 5 illustrates the HPLC chromatograms of the initial oil. The molecules of interest in this example are esters of diterpenes, in low concentration in coffee oil.

The molecular distillation is carried out according to the following procedure known to those skilled in the art: the barrel temperature is set at 280° C., the condensation temperature is 80° C. The oil flow rate is 1.2 L/h for a pressure of between 2.10 and 3 mbar:
the system is placed under vacuum at a pressure of around $10^{-3}$ and $10^{-2}$ mbar
the distillation barrel is heated to 280° C.
the condenser is heated to 80° C.
the feed tank is filled with vegetable oil (fluid to be extracted) and the feed rate is set to 1.2 L/h The oil is scraped against the wall of the distillation barrel for about ten seconds (between 10 and 20 seconds). The molecules of interest evaporate and recondense on the condenser located in the center of the distillation barrel.

The two fractions are separated by the system and collected in two different containers.

The extract obtained after molecular distillation makes it possible to increase the concentration of molecules of interest, as can be seen in the HPLC chromatogram of the extract obtained by molecular distillation (FIG. 5).

The HPLC chromatogram of the ethanolic extract obtained by means of the process according to the invention makes it possible to compare the two extraction methods discussed in this example.

One can see, in the HPLC chromatogram of the ethanolic extract obtained by means of the process according to the invention, that the molecules of interest are concentrated therein more efficiently than by molecular distillation. Indeed, the yield obtained after a first pass via molecular distillation is between 12 and 15%. It is therefore necessary to make two passes in molecular distillation in order to fully extract the molecules of interest and obtain a final (and maximum) yield of 25%.

The extraction implemented according to one embodiment of the invention also has the advantage of revealing new molecules (potentially of interest), as demonstrated by the chromatogram peaks located at about 7 min in the case where the vegetable oil is coffee oil.

The HPLC chromatograms thus clearly demonstrate that the efficiency of the process according to the invention is at least equivalent to the very good results obtained by molecular distillation, with significantly reduced operating costs. In addition, the invention provides the advantage of allowing the extraction of new molecules that molecular distillation does not allow isolating.

Another comparative example was carried out in order to compare the extraction results according to the process of the invention of Example 2 with the extraction results obtained according to a conventional extraction by molecular distillation.

Conventional liquid/liquid extraction is performed in a separatory funnel with 1 part oil to 3 parts ethanol. Unlike the process of the invention, liquid-liquid extraction in a separatory funnel has the disadvantage of causing the appearance of emulsions produced by the oil with the ethanol. The total extraction yield is about 13%. However, the extract is richer in triglycerides, molecules we do not want to extract. Consequently, the extract resulting from conventional liquid/liquid extraction is less enriched in molecules of interest.

The table below shows the results of the comparative Example 2.

| | Concentration of molecules of interest | Triglycerides | Fatty acid |
|---|---|---|---|
| Chia oil | 0.1% | 99.2% | 0.6% |
| Ethanolic extract according to the process of the invention | 5.3% | 60.6% | 33.4% |
| Refined oil according to the process of the invention | 0.1% | 99.3% | 0.5% |
| Chia distillate by control extraction | 4.37% | ~1% | 94% |
| via molecular distillation | | | |

The extract obtained after molecular distillation increases the concentration of molecules of interest as can be seen in the HPLC chromatogram of the extract obtained by molecular distillation (FIG. 6).

In FIG. 6, the HPLC chromatogram of the ethanolic extract obtained by means of the process according to the invention makes it possible to compare the two extraction methods discussed in this example.

The extraction implemented according to one embodiment of the invention offers the advantage of revealing new molecules (ethyl esters), as shown by the chromatogram peaks located at around 7 min.

The HPLC chromatograms thus clearly demonstrate that the efficiency of the process according to the invention is at least equivalent to the very good results obtained by molecular distillation, with significantly reduced operating costs. In addition, the invention offers the advantage of allowing the extraction of new molecules that molecular distillation does not allow isolating. Finally, the invention makes it possible to refine oils while reducing, for example, their fatty acid content.

LIST OF REFERENCE SYMBOLS

10: microfluidic chip
100: pressure controller
F1: first fluid, for example ethanol as the extraction solvent
F2: second fluid, for example vegetable oil
E1: inlet for fluid F1 into the microfluidic chip
E2: inlet for fluid F2 into the microfluidic chip
F1: outlet for fluid F1 from the microfluidic chip
F2: outlet for fluid F2 from the microfluidic chip
R1: vessel for fluid F1
R2: vessel for fluid F2
C1: collector for fluid F1 enriched in or depleted of the molecule of interest
C2: collector for fluid F2 enriched in or depleted of the molecule of interest
PJ: junction point
PD: separation point
L: length of main channel
h: depth of main channel
I: width of main channel
$Q_1$: flow rate of fluid F1 in the microfluidic chip
$Q_2$: flow rate of fluid F2 in the microfluidic chip
$w_1$: width occupied by fluid F1 in the main channel
$w_2$: width occupied by fluid F2 in the main channel.

The invention claimed is:

1. An extraction process for microfluidic extraction of molecules of interest from a vegetable oil, comprising:
    a) providing a microfluidic chip with a double-Y-channel circuit, wherein said microfluidic chip comprises two inlets, two outlets, and a main channel,
    a first vessel comprising vegetable oil,
    a second vessel comprising an extraction solvent for extracting the molecules of interest, said extraction solvent being ethanol, said first and second vessels, each being in fluid connection with the two inlets of the microfluidic chip,
- a pressure controller capable of pressurizing the vegetable oil and said extraction solvent,
- a first collector in fluid connection with the microfluidic chip, in which a vegetable oil enriched in triglycerides is collected, and
- a second collector in fluid connection with the microfluidic chip, in which an extraction solvent enriched in molecules of interest is collected, b) controlling pressures in order to subject the vegetable oil to a pressure P1 and the extraction solvent to a pressure P2, such that an interface between the vegetable oil and the extraction solvent is positioned at a junction point of inlets, c) bringing the vegetable oil and the extraction solvent into contact with each other in the main channel for a period of time enabling extraction of the molecules of interest, d) collecting the extraction solvent enriched in molecules of interest, e) optionally, evaporating the extraction solvent from the extraction solvent enriched in molecules of interest, and f) collecting the vegetable oil enriched in triglycerides.

2. The process according to claim 1, wherein the extraction is carried out at room temperature.

3. The process according to claim 1, wherein the pressure controller is operated so that the flow rate of the extraction solvent exiting the microfluidic chip is between 0.01 μL/s and 500 μL/s.

4. The process according to claim 1, wherein the pressure controller is operated so that the flow rate of the vegetable oil exiting the microfluidic chip is between 0.001 μL/s and 500 μL/s.

5. The process according to claim 1, wherein the microfluidic chip is configured so that the inlet channels join at a junction point to form a single main channel, said single main channel having
- a width between 50 and 500 μm,
- a depth H between 1 and 800 μm,
- a total volume V of the single main channel, between the junction point and a separation point of the two outlet channels of the Y-channel circuit, of between 0.1 μL and 20 μL.

6. The process according to claim 1, wherein the microfluidic chip is made of a material chosen among glass, thermoplastics, silicon or a polymer.

7. The process according to claim 1, wherein the pressure controller is operated at pairs of pressures (P1, P2) such that the condition w1=a·w2 at a separation point of the two outlet channels of the Y-channel circuit is satisfied; w1 and w2 being the widths respectively occupied by fluids within the main channel of the microfluidic chip, "a" being a positive real number between 0 and 1, and corresponding to a safety margin.

8. The process according to claim 1, wherein at least N microfluidic chips with a double-Y-channel circuit are operated in parallel, N being an integer between 1 and 200,000.

9. The process according to claim 1, wherein the extraction is carried out at a temperature between 20 and 30° C.

10. The process according to claim 1, wherein the extraction is carried out at a temperature between 22 and 27° C.

* * * * *